(12) United States Patent
Delchev et al.

(10) Patent No.: US 11,029,943 B1
(45) Date of Patent: Jun. 8, 2021

(54) PROCESSING FRAMEWORK FOR IN-SYSTEM PROGRAMMING IN A CONTAINERIZED ENVIRONMENT

(71) Applicant: SAP SE, Walldorf (DE)

(72) Inventors: Nedelcho Nedyalkov Delchev, Sofia (BG); Mitko Kolev, Walldorf (DE); Yordan Pavlov Pavlov, Sofia (BG); Georgi Dimitrov Pavlov, Sofia (BG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/912,840

(22) Filed: Jun. 26, 2020

(51) Int. Cl.
  *G06F 9/44* (2018.01)
  *G06F 8/656* (2018.01)
  *H04L 29/08* (2006.01)
  *G06F 8/20* (2018.01)

(52) U.S. Cl.
  CPC ............... *G06F 8/656* (2018.02); *G06F 8/20* (2013.01); *H04L 67/34* (2013.01); *H04L 67/10* (2013.01)

(58) Field of Classification Search
  CPC . G06F 8/656; G06F 8/20; H04L 67/34; H04L 67/10
  USPC .................................................. 717/104, 106
  See application file for complete search history.

(56) References Cited

U.S. PATENT DOCUMENTS

2014/0297713 A1\* 10/2014 Meigen ..................... G06F 8/20
  709/203

OTHER PUBLICATIONS

U.S. Appl. No. 16/456,193, Kolev et al., filed Jun. 28, 2019.
Odata.org [online], "Overview (Odata Version 2.0)", Mar. 2014,[retrieved on Sep. 14, 2020], retrieved from: URL <https://www.odata.org/documentation/odata-version-2-0/overview/>, 9 pages.
Odata.org [online], "Trip Pin RESTier Service",[retrieved on Sep. 14, 2020], retrieved from: URL <https://services.odata.org/TripPinRESTierService/(S(nyfhatoodd1js1mbthzx1ook))/$metadata>, 4 pages.
SAP.com [online], "Odata Service Definition Language Syntax (XS Advanced)", Oct. 2019,[retrieved on Sep. 14, 2020], retrieved from: URL<https://help.sap.com/viewer/b3d0daf2a98e49ada00bf31b7ca7a42e/2.0.04/en-US/73a801f25cbf425994f22b06d3850591.html>, 3 pages.

\* cited by examiner

*Primary Examiner* — Chuck O Kendall
(74) *Attorney, Agent, or Firm* — Fish & Richardson P.C.

(57) ABSTRACT

The present disclosure relates to computer-implemented methods, software, and systems for lifecycle processing of declarative artifacts. Declarative artifacts defining a target state for application content related to a software application are read. When running, the software application includes runtime artifacts executing in a containerized environment. Model definition objects for processing during runtime of the software application based on the declarative artifacts are created and stored in a model repository at a container associated with the software application. The model repository is scanned as well as the runtime artifacts executing as part of the software application in the containerized runtime environment to identify a model definition object from the model repository for processing at runtime of the software application. An operation related to a runtime artifact to run as part of the running software application at the containerized runtime environment is executed based on input from the identified model definition object.

20 Claims, 4 Drawing Sheets

PROCESSING FRAMEWORK FOR IN-SYSTEM PROGRAMMING IN A CONTAINERIZED ENVIRONMENT

TECHNICAL FIELD

The present disclosure relates to computer-implemented methods, software, and systems for deployment management of software products in a container environment.

BACKGROUND

Different platforms can be used as part of a software development lifecycle management process. These platforms may provide different tools for development and testing applications, and different runtime infrastructures for executing the applications.

When a new version of a software application is to be released, the complete landscape where the new version is to be installed may need to be evaluated. Technical specifications of the landscape may be taken into consideration when planning for the execution of the new version. A new environment may be defined for deploying and running the new version of the software application. The complexity of managing the software development lifecycle process may be associated with executing tasks for managing software development lifecycles related to a migration of a software application from one environment to another, thus to provide the new version of the software application in production mode. Further, modifications to a running system in a particular environment may be integrated as part of the software lifecycle management process.

SUMMARY

The present disclosure involves systems, software, and computer implemented methods for lifecycle processing of declarative artifacts in the context of in-system programming in a containerized runtime environment.

One example method may include operations such as reading declarative artifacts defining a target state for application content related to a software application that, when running, includes runtime artifacts executing in a containerized runtime environment; in response to reading the declarative artifacts, creating model definition objects for processing during runtime of the software application based on the declarative artifacts, wherein the model definition objects are created based on and include information from the declarative artifacts, wherein the created model definition objects are stored in a model repository at a container associated with the software application; scanning, by a processing framework at the container, the model repository and the runtime artifacts executing as part of the software application in the containerized runtime environment to identify a model definition object from the model repository for processing at runtime of the software application, wherein the model definition object is identified as relevant for performing an update at the containerized runtime environment to place the running software application into the target state; and in response to identifying the model definition object for processing, executing an operation, by the processing framework, related to a runtime artifact to run as part of the running software application at the containerized runtime environment, wherein the operation is executed based on processing logic implemented at the processing framework and is based on input from the identified model definition object, wherein the runtime artifact corresponds to a particular declarative artifact associated with the model definition object. Other implementations of this aspect include corresponding systems, apparatus, and computer programs configured to perform the actions of the methods, encoded on computer storage devices.

Implementations can optionally include that the declarative artifacts define target states for runtime artifacts running in the containerized runtime environment, wherein the artifacts are associated with at least one of database components or an application service of the software application.

In some instances, the executed operation related to the runtime artifact is associated with placing the runtime artifact in a runtime state corresponding to a target state defined within the particular declarative artifact associated with the model definition object.

In some instances, declarative artifacts are read in response to a trigger initiated from a scheduled job for managing the software application, and wherein the created model definition objects include information relevant for deploying one or more of the created model definition objects.

In some instances, the identified model definition objects are associated with declarative artifacts that are not processed and are related to performing operations for creating, altering, or deleting runtime artifacts at the running software application, and wherein the execution of the operations is based on corresponding invoking the processing logic to execute the operations according to data invoked from the identified model definition objects.

In some instances, the model repository and the runtime artifacts executing as part of the software application in the containerized runtime environment are scanned. The scanning comprises: comparing the model definition objects with metadata for running artifacts of the running software application, wherein comparing is based on hash codes defined for the running artifacts in a meta-data repository and within the model definition objects to determine whether the declarative artifacts corresponding to the model definition objects have been previously processed.

In some instances, the declarative artifacts are created at a design time process for the software application and represent a technical state of a component of the software application, and wherein the declarative artifacts are declarative text-based artifacts.

In some instances, the container is built as a deployable instance for execution at the running software application on a cloud infrastructure setup, wherein the container at runtime comprises one or more runtime artifacts corresponding to one or more of the declarative artifacts as built-in artifacts.

In some instances, scanning the model repository and the runtime artifacts executing as part of the software application in the containerized runtime environment comprises: processing the model definition object for in-system programming in the containerized runtime environment to unify states defined correspondingly in the declarative artifacts with states of runtime artifacts at the running software application and to update the running software application to a new state. Unifying the states may comprise: creating a new runtime artifact for a model definition object that do not correspond to running artifacts at the software application; altering a running runtime artifact in response to determining that model definition objects mapped to the running runtime artifact are associated with altering operations; and deleting a running runtime artifact at the software application, wherein the deleted running runtime artifact is an artifact that is not associated with a model definition object from the model repository for the software application.

In some instances, the runtime artifact that is associated with the executed operation is part of the running software application prior scanning by the processing framework.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and embodiments of the present disclosure are set forth in the accompanying drawings and the description below. Other features, objects, and advantages of the disclosure will be apparent from the description, drawings, and the claims.

DETAILED DESCRIPTION

The present disclosure describes various tools and techniques for lifecycle processing of declarative artifacts in the context of in-system programming in a containerized runtime environment.

Software development lifecycle includes multiple stages including development, deployment, testing, release, update, and upgrade, among others. These stages may be associated with different requirements and constraints imposed by the process and/or by the infrastructure defined for the software execution. Different tools and techniques can and may be used during the different lifecycle stages.

A software application (or application component, application service, software system, etc.) may be executed on different environments, such as environments provided from cloud or on-premise platforms. For example, a software application may be executed on a platform environment where runtime is provided for executing software applications together with platform services, configurations, among others. Such platform environments may support different tools for managing, scaling, and executing the software application. The software application may be released by a software provider and can be integrated into different customer environments. The customer environment may provide different runtime set-ups that support different technologies and frameworks for software lifecycle management. The software application may be developed according to a given technology, and different build and deploy tools may be used to execute the software application on the different runtimes. The different built and deploy tools may have specifics for managing and maintaining design time, built time, and runtime artifacts.

In some instances, a software application may be defined and developed to be executed in a particular environment, such as a containerized environment, and have a predefined target state at runtime. A containerized environment may provide a framework for orchestration of an application (or a software system) for automating deployment, scaling, and operations of application containers associated with the system (or application) across clusters of hosts. In those instances, the software application can run in containers organized in clusters, where the clusters run on top of hardware host machines.

In some instances, a predefined target state for a software application at runtime may include definitions for runtime artifacts that are part of the running application. For example, the definitions may include specific technical definitions for services provided by the running software application, definitions of database objects, (e.g., tables and views), and others.

In some instances, such a definition of a target state for an application at runtime may be requested from a software provider in relation to different use cases for the software application. For example, a software application may be executed at one environment and may be requested for migration at the containerized environment with that target state. In yet another example, the software application may be running in the containerized environment and the target state may be defined for a new updated version of the same running application in the same containerized environment. In some cases, the software application may be defined to be in a target state in the containerized environment where it may interact with other software applications, database components, and other applications and components that are already running and pre-integrated in the containerized environment. Further scenarios where a target state for an application may be defined and requested in relation to execution at a containerized environment may be defined.

When software applications are migrated from one environment to another, the migration may include a modification of the application source code in order to adapt it to the new environment. However, such a migration is associated with additional development effort, which may be associated with performing a re-design of the software application's architecture, changes in the application's source code and manner of communication with external services, and other significant and insignificant modifications. In some cases, manual adjustment of the outcome from migration tools may be involved in the effort to bring a system to "life" in a different environment. Therefore, an automatic migration may not be possible at all times due to differences in the technical concepts.

In some instances, one software application may be migrated from a first platform environment to a second platform environment, where the different platform environments may be associated with different development lifecycles, including different build and deployment processes. In such cases, the migration may require modifications and adaptations to the underlying code and configuration of the software application in order to be compatible with the second platform environment. In some instances, migration of a software application or a system from one non-containerized environment to another containerized environment (or from a first containerized environment to a different second containerized environment) may include moving or integrating a new application or system into the containerized environment. For example, the setting up of the software application in the containerized environment may be performed in accordance with the defined requirements and specification, where a target state for the running software application may be provided.

In some instances, a software application is developed and released for productive use, where the software application is defined for execution at a production environment including other software application or components. The other software applications and services may be running in a particular production environment, such as a containerized environment. In some cases, the software application may be migrated to the containerized environment of the other applications and services. In some other instances, a modification to the execution of the software application at a containerized environment may be requested to bring the running software application to a target state at runtime. A modification of a running software application may include adjustments to the software application by performing one or more operations on the running application based on input for or indicating a target state of the running software application.

In some instances, to support a goal of providing a running software application at a containerized environment in a target state, a processing framework may be instantiated and may be incorporated in a container for execution in the containerized environment. The running software application may be defined as a migrated version of a software application running in another environment, or may be defined as a new modified version of a software application already running at the given containerized environment. For example, the processing framework may facilitate bringing a running application that is in a current state to the target state different from that current state. The target state may be defined by declarative artifacts describing application content. The declarative artifacts may be processed to determine modifications for the running application and bringing the running application to the target state without re-deployment and re-development. In some instances, a migration of a software application from one environment to the containerized environment using the processing framework logic implemented at the containerized environment may support or allow the running software application to be brought to the target state without re-development of the application and without re-deployment of the application.

In some instances, to alter a live system (including a running software application, service, and/or database) to a target state without re-deployment, an in-system programming model may be implemented for the processing framework. The live system can be, for example, a running software application on an application server including a database, a database system, or an application service, among others. The in-system programming model is a development technique used to alter a system while running without re-deployment. Therefore, with the in-system programming model, the operations of running code may be altered while the code is running on a live system. By using an in-system programming model to bring a live system to the target state, instant access to a pre-integrated stack of runtime artifacts can be provided. Further, a shorter turn-around time is achieved as the operations are executed on a running system without the need to re-design and/or redevelop the system and its operations. For example, such re-design and redevelopment may require time and knowledge for performing specific operations corresponding to the underlying technology and requirements for the live system. Further, if altering of the system is to be performed on the original system before deployment, altering the original source code to an updated source code that, when executed, would bring the running application in a target state may be necessary. Even further, in some cases, a full re-design or re-development may be performed to provide a system in a target state in a particular environment, such as a containerized environment.

Re-design and re-development of a system to be brought to a target state may require spending significant resources (e.g., computing resources, development resources, time, knowledge, and testing time, etc.). Thus, the running system's availability may be reduced, and access to the running system in the target state can be delayed. To address such challenges, the processing framework as described herein may be provided in the containerized environment to support updating a running software application into a target state without re-development and re-deployment.

In some instances, when a software application or a service is built, binary files can be created and executed on a runtime infrastructure. When requests for changes to the software application are made, the runtime artifacts of the previous version of the software application or service should be updated and provided in sync with design artifacts defining changes for the software application.

In some instances, when a software application that is built has to be maintained and updated to a target state, a target state of the system may be defined during design time. The software application may be a containerized application that is run within container images that may be organized in clusters and run on a host system providing a host operating system and infrastructure. A containerized application may be provided as software packaged into units for development, shipment, and deployment.

In some instances, there are challenges during lifecycle management of design time and runtime artifacts of a software application, a service, a database, and others, such as when those components or portions have to be kept in sync, for example, when updating runtime artifacts to a target state defined with design time artifacts. Such synchronization may be necessary when one system is transitioned from one environment to another. For example, new runtime artifacts may be necessary to allow the application to execute. In other cases, synchronization may be necessary when an update to a live system is to be provided over a running or currently executing system. Additionally, such synchronization may be performed when a completely new system has to be executed in a given environment, such as a containerized environment. Providing tools and techniques to synchronize states of design time artifact with runtime artifacts may be associated with challenges, such as keeping zero-downtime during updates, providing high availability, managing disaster recovery, and other cloud-native system properties that are relevant for the improved performance of the system, even when undergoing alterations or modifications.

In some instances, existing classical systems lack capabilities to provide horizontal scaling to handle execution of processing-heavy tasks associated with running an application. To address such a challenge in classical systems, a processing framework including a runtime stack may be provided to integrate a lifecycle process for release of software products from declarative artifacts. The declarative artifacts may be defined for software components, software applications, software services, and database system, among others. To address the horizontal scaling of already running systems that are integrated in a productive landscape, the containerized environment may be provided with implemented logic at the processing framework to allow for building and deploying runtime artifacts that are in sync with pre-defined declarative artifacts.

In some instances, the declarative artifacts may be defined during design time of a software application. For example, declarative artifacts may be defined in relation to designing a new software application, a new component for a software application, an application service, a database, among others. The declarative artifacts may represent application content, and may include a technical description in a human-readable text-based format.

In some instances, a processing framework may be provided as part of a container that is a packaged software image that is lightweight, standalone, and executable, as it includes the necessary components to run an application, such as, code, a runtime, system tools and libraries, settings, and configurations. A container image becomes a container at runtime when instantiated. There are different platform technology providers supporting execution of containerized applications, such as, DOCKER, KUBERNETES, etc. For example, DOCKER is a platform and tool for building, distributing, and running containers on a runtime engine, i.e. Docker Engine. KUBERNETES is a container orchestration system for Docker containers that provides options to coordinate clusters of nodes (containers) that scale in production in an efficient manner.

In some instances, a container image is pre-packed with the logic of the processing framework providing lifecycle management of design time and runtime artifacts to have them kept in sync, where the design time artifacts are declarative descriptions in text format defining a target stated for runtime artifacts at a running live system. Based on the logic implemented in the processing framework, the design time artifacts are evaluated and the live system, including already executing runtime artifacts, may be updated, without redeployment, to be placed into a target state corresponding to the states defined in the declarative descriptions.

Figure 1:
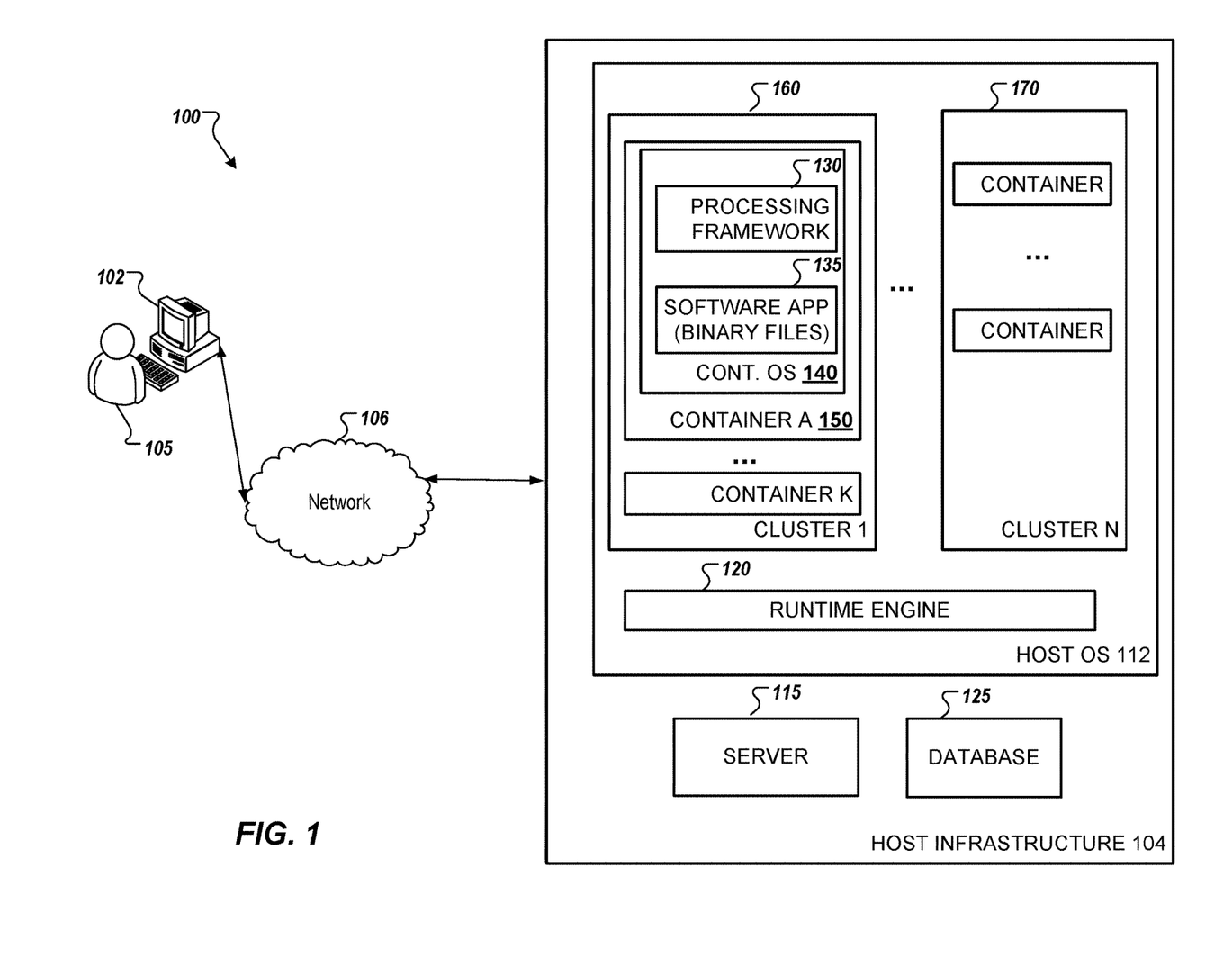
FIG. 1 illustrates an example computer system architecture that can be used to implement a system for lifecycle processing artifacts in accordance with implementations of the present disclosure.

FIG. 1 depicts an example architecture 100 in accordance with implementations of the present disclosure. In the depicted example, the example architecture 100 includes a client device 102, a network 106, a host infrastructure 104, and a live system 110. The host infrastructure 104 may include one or more server devices, processors, and memory. In the depicted example, a user 105 interacts with the client device 102 and may communicate with the host infrastructure 104 via the network 106.

In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices, and server systems.

In some implementations, the host infrastructure 104 includes at least one server, such as server 115, and at least one data store, such as a database 125. In the example of FIG. 1, the host infrastructure 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some instances, software can be deployed and managed on the host infrastructure 104. There may be different technologies used to manage and deploy a software application in a containerized environment that is set up on the host infrastructure 104. For example, KUBERNETES provides a system for orchestrating clusters of nodes defining containers that scale to provide greater efficiency, as they are lightweight software packed with only a small portion of software that can be used to run a software application, service, or component.

The host infrastructure 104 is provided with a host operating system (OS) 112 where multiple clusters in relation to containerized software applications and/or components or services are defined. The provided multiple clusters include clusters, such as "Cluster 1" 160 to "Cluster N" 170, that correspond to one or more software application that are to be executed on the runtime engine 120 in the containerized manner.

In some instances, the clusters, such as "Cluster 1" 160, includes multiple nodes representing containers as layers of abstraction to define small units of computing hardware. The containers may be defined as a representation of a single machine in a cluster. The multiple clusters, including multiple containers, may be running on a host infrastructure provided from a physical or a virtual machine hosted, for example, on a cloud platform.

In accordance with implementations of the present disclosure, and as noted above, the host infrastructure 104 can host a containerized application that is executed on a runtime engine 120. In some instances, the host infrastructure 104 may provide a containerized environment that includes implemented logic for building and deploying runtime artifacts in containerized manner to support modifications to a running application or system. The running application includes runtime artifacts executed at a containerized runtime environment. In some instances, the containerized environment is provided with processing logic for receiving declarative artifacts describing target states for runtime artifacts of that running application and for transforming the current state of the running application or system to that target state. Such processing logic may be provided as pre-defined logic included in containers in the clusters from "Cluster 1" 160 to "Cluster N" 170 within the containerized environment running on the host infrastructure 104. In such instances, the processing logic may be provided within a container, such as Container A 150, as included in a processing framework 130.

A container, such as Container A 150, from the presented containers, that is part of a cluster (e.g., "Cluster 1" 160, "Cluster N" 170), may be defined as a standard unit of software in a containerized environment, where this unit packages up code and dependencies so that an application can run quickly and reliably from one computing environment to another. A container image is a standalone and executable package of software provided with implemented logic, including instructions for processing declarative artifacts and performing in-system development during runtime over a live running application to alter a current state of the running application to a target state based on the defined target state in the declarative artifacts. The declarative artifacts may be generated during design time of the system that is to be modified. That logic is provided in the processing framework 130 that is pre-defined for the Container A 150.

In some instances, based on the logic implemented in the processing framework 130, a synchronization between design time artifacts and runtime artifacts may be performed without re-development of the source code of the runtime artifacts. In such cases, during design time, declarative artifacts can be defined in relation to a new version of a software application running on the host infrastructure 104. The declarative artifacts can be provided in a human-readable text format defining technical descriptions for target states of runtime artifacts corresponding to software components, software applications, software service, database objects, and other objects or components. Based on the implemented logic at the processing framework 130, these declarative artifacts are parsed and evaluated to generate a repository of binary files for a software application 135 as a repository modeling the target state of the running software application 135. The stored binary files for the software application 135 may be evaluated based on the processing logic implemented at the processing framework 130, and corresponding action may be performed at runtime of the software application to modify the state of the running software system to correspond to the target state. Modifying the state may include performing operations, including modification of a state of an already existing runtime artifact to a new state defined in the corresponding binary file based on the declarative artifact. The modification of the state may include executing a new runtime artifact that was not part of the running software application. The modification of the state may include removing runtime artifacts from the running software application when a corresponding binary artifact for such a runtime artifact is not part of the software application 135 defined as a model for the target state.

In some instances, the defined containers are isolated, but still share the host OS 112 and, in some cases, appropriate libraries and binaries provided from the host infrastructure 104. A software application may be packaged into one or more containers as part of the clusters defined on the host infrastructure 104.

In some instances, Container A 150 is part of "Cluster 1" 160 and is provided with a container OS 140 where the processing framework 130 is integrated. Other containers from the clusters may correspond to the Container A 150. The processing framework 130 provides processing instruction units for parsing, scanning, evaluating, and comparing input target states for runtime artifacts with actual states of the runtime artifacts on a live system, allowing operations to be performed on the live system to modify the state of the live system to the target state without re-development of the source code defined for the originally running software application.

In accordance with the present implementations, such synchronization between design time and runtime artifacts to bring a running system to a target state is performed without re-development of the source code and without redeployment, and is thus performed through in-system development techniques. Such in-system techniques implemented when synchronizing runtime artifacts with design time artifacts may be associated with multiple technical advantages. Such technical advantages include shorter lifecycle from design to production, and improved resource spending as the containerized environments is lightweight and include only the necessary processing logic for execution on the live system. Further, as changes to a running system are performed during runtime, the solution provides an ease to transitioning between different environments without manual development effort for developing and integrating into a running system. As changes are executed during runtime, integration of the running software application with other software applications or systems is pre-defined, with no need for re-integration. As such, resource spending is improved and modifications are performed more efficiently within shorter time frames.

Figure 2:
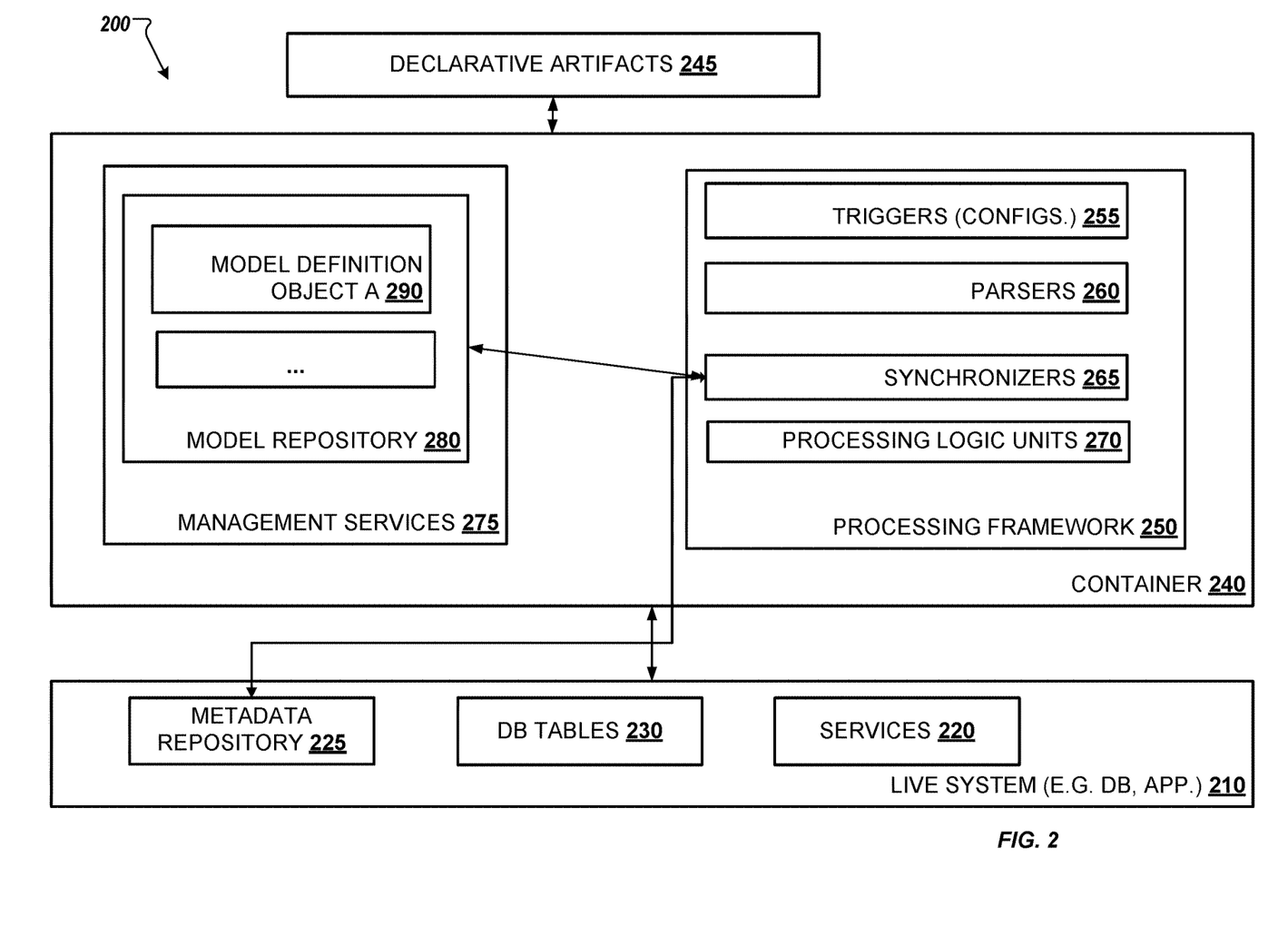
FIG. 2 is a block diagram for an example system for lifecycle processing of declarative artifacts in the context of in-system programming in a containerized runtime environment in accordance with implementations of the present disclosure.

FIG. 2 is a block diagram for an example system 200 for lifecycle processing of declarative artifacts in the context of in-system programming in a containerized runtime environment in accordance with implementations of the present disclosure.

In some instances, the example system 200 provides tools and techniques for lifecycle management of design time artifacts and runtime artifacts. In some instances, the example system 200 may be part of the described example architecture 100 of FIG. 1, where the container 240 may correspond to the Container A 130 of FIG. 1.

For example, a software application (e.g., service, component, database, database component, or others) may be executed in a containerized environment and associated with a request for modification of the running instance to correspond to a target state for the runtime instance. In yet another example, a software application may be requested to be modified so that it is transitioned from one runtime environment, either containerized or not, to another containerized runtime environment. Thus, a new running application on the containerized runtime environment may be provided based on the tools and techniques for lifecycle management in accordance with the present implementations.

A design time framework may be provided that includes development tools to define declarative artifacts 245 in relation to defining a target state for a software application running in a containerized environment, such as live system 210. The live system 210 includes runtime artifacts, such as database tables 230, services 220, and a metadata repository 225, where the repository 225 stores data and configurations related to the running artifacts on the live system 210.

In some instances, the declarative artifacts may be declarative RESTful service artifacts representing a technical description of one or more OData Services in a readable text-based format. The format used for describing the artifacts can be JSON, YAML, or another domain specific language (DSL), such as SAP®'s XSOData.

In some instances, the declarative artifacts may be declarative database artifacts representing the technical description of one or more database objects, such as tables, views, stored procedures, sequences, and others, where the description is defined in a readable text-based format. The format used for describing the artifacts can be JSON, YAML, or a specific DSL created for this specific domain, such as SAP®'s CDS Documents. For example, a CDS document is a design-time source file that contains definitions of the database objects that are to be created in a database.

In some instances, a design time process for the declarative artifacts may include an authoring phase for the declarative artifacts, such as RESTful Services artifacts, OData Services artifacts, and database object artifacts, among others. The design time phase may finish when the new declarative artifacts corresponding to a modified version of a runtime artifact or to a new runtime artifact has been defined and pushed to a repository, such as a source control management repository (e.g., GIT).

In some instances, the container 240 may be part of a cluster executing on a platform infrastructure such as SAP® Cloud Platform.

In some instances, the container 240 includes a runtime stack comprising components for processing the declarative artifacts 245. In some instances, a container 240 is instantiated to include a processing framework 240 and managing services 275. The container 240 may be the Container A 150 of FIG. 1. In some instances, the processing framework 240 may be configured for processing design time artifacts defining a target state for a live system 210, such as the declarative artifacts 245.

The processing framework 250 includes triggers 255, parsers 260, synchronizers 265, and processing logic units 270. The triggers 255 may be defined in relation to scheduled jobs for specific time periods or events for initiating reading declarative artifacts and executing processing logic. The definition of the triggers 255 may be based on the use case and the system load, which start the synchronizers 265. In some instances, jobs can be configured to be cluster-wide and relevant for a number of containers, as discussed in relation to FIG. 1.

In some instances, the synchronizers 265 are artifact-specific processors that apply logic for creation, updating, or deleting runtime artifacts at the live system 210 when triggered. The synchronizers 265 include implemented logic to read information from the model definition objects at the model repository 280 and determine what operation is to be performed on the live system 210 in relation to the defined operation and according to operation instructions defined based on the read information.

In some instances, the parsers 260 read the declarative artifacts 245 that are text descriptions and create model definition objects 290 ready for processing at runtime. Model definition objects 290 comprise information from the declarative text-based artifacts. The model definition objects 290 are stored at a model repository 280 maintained by the management service 275.

In some instances, the management service 275 is instantiated in the container 240 to provide create, read, update, and delete (CRUD) operations for key attributes of the model definition objects 290. For example, key attributes of the model definition objects 290 may include location, name, hash codes, date and time of creation, owner, and other relevant and suitable attributes.

In some instances, when the parsers 260 read the declarative artifacts 245 and create the model definition objects 290, these model definition objects are binary artifacts that produce an immutable container image. The immutable container image is generated based on the build infrastructure provided by the containerized environment. For example, the containerized environment may provide container infrastructure, such as DOCKER, and a build infrastructure that is used for creating the container image, such as Knative.

In some instances, at runtime, the binary artifacts represented by the model definition objects 290 may be used for in-system development at the running live system 210. The container 240, as a runtime stack, holds the application artifacts built-in. Based on logic implemented, at the synchronizers 265, and by correspondingly invoking the processing logic units 270, the live system 210 may be synchronized with the target states defined in the declarative artifacts 245.

During runtime, the synchronizers 265 scan the model repository 280 and runtime artifacts executing as part of the live system 210 in the containerized runtime environment. The scanning of the model repository 280 and the runtime artifacts is performed to identify a model definition object (e.g., 290) from the model repository 280 for processing at runtime of the live system 210.

In some instances, based on logic implemented at the synchronizers 265 and at the processing framework 240, a model definition object 290 is identified as relevant for performing an update at the live system 210. The processing logic may determine which model definition object from the model repository 280 is relevant for performing an update. The synchronizers 265 may include comparison logic to identify which runtime artifacts that are part of the running live system 210 are to be updated, and/or which runtime artifacts are to be created as new runtime artifacts at the runtime environment.

In some instances, in addition to identifying model objects part of the model repository 280 that are relevant for executing processing operations for runtime artifacts on the live system 210, the processing framework 240 may evaluate whether there are runtime artifacts from the running live system 210 that do not correspond to model objects defined in the model repository 280. For example, a table from the database tables 230 may be defined at the current version (state) of a running live system 210, and the model repository 280 may not include a model object for such a table. For example, the determination may be based on comparison of names of database tables defined in the model repository 280 and the metadata repository 225, including data for the runtime artifacts of the live system 210. In response to a comparison between the model objects and the running artifacts, the running artifacts that do not correspond to a model object, for example, based on a name and/or type evaluation, may be associated with execution of a delete operation.

In some instances, the identified model definition object is associated with a declarative artifact that is not processed by the processing framework 240 in relation to modifying the running live system. In other instances, the declarative artifacts 245 that are read by the parsers 260 may have already been processed as provided within a previous iteration of reading declarative artifacts received as input. The identified model definition objects may be related to performing operations for creating, altering, or deleting runtime artifacts at the running live system 210.

In some instances, based on evaluation logic implemented at the synchronizers 265, different operations are defined to be executed on the live system. The execution of the operations may be based on corresponding processing logic that is invoked from the processing logic units 270 to execute the operations. When the operations are executed, data from the corresponding model definition objects is invoked to execute the operations based on the data to provide runtime artifacts to form application content in the target state corresponding to the read declarative artifacts.

In some instances, at runtime for productive landscapes, the synchronizers 265 may perform the scanning only once (or on discrete time intervals defined for state validation) due to the fact that the container 240 is immutable. In some instances, based on the scanning, a new or a changed artifact is discovered and associated with performing an operation on the live system 210. Further, all of the model definition objects in the model repository 280 may be collected for further processing to identify a list of operations for execution by the processing logic units 270. The comparison is performed by the synchronizers 265, where a check is performed against hash codes defined for the runtime artifact in the metadata repository 225 and for the model definition objects in the model repository 280 to determine whether these runtime artifacts has previously been processed.

In some instances, once all the runtime artifacts and the model definition objects are scanned, a sorting phase is performed. Based on the sorting, an ordering of tasks associated with one or more of the runtime artifacts at the live system and/or in relation to new runtime artifacts for deploying on the live system 210, is defined. The tasks are ordered for processing based on an order of processing execution that is determined to support efficient execution of the tasks based on their dependencies. The tasks are sorted based on an evaluation of dependencies between executions of corresponding runtime artifacts. For example, tables are to be created before the views, as usually views are based on already-created tables. The determination of dependencies may be performed by an evaluation of the defined operations that are necessary to be performed to place the live system 210 into a target stated as defined in the model definition objects in the model repository 280.

In some cases, a more complex (e.g., topological) sorting can be used in case there are dependency references mentioned in the model object definitions. Once a processing ordering is determined, the process continues with consecutive execution of logic specific for the given artifact type by calling a processing unit from the processing logic units 270. For example, based on execution of an example processing logic unit, a database artifact, such as a data table from the database tables 230, may be created. When the processing task performed by the processing unit is performed successfully, the exact status and hash code of the artifact is stored in the metadata repository 225.

In some instances, and as a next operation for an execution performed by the processing framework 240, a reverse cycle over the artifacts running in the live system 210 is performed. In the reverse cycle, metadata from the metadata repository 225 that is associated with the running artifacts is evaluated to determine whether there is one or more running artifacts that do not correspond to an existing model definition object in the model repository 280, for example, as part of a list of scanned model definition objects. In such instances, runtime artifacts may have to be deleted in the new version of the live system 210 to provide the live system 210 in an updated form that corresponds to the target state. The task for deletion of a runtime artifact is performed by a corresponding processing logic unit from the processing logic units 270 that can be configured via environmental variables and in relation to defined events. In some instances, and after performing the processing logic according to the tasks defined by the synchronizers 265, a clean-up operation can be performed for the used resources during the synchronization.

Figure 3:
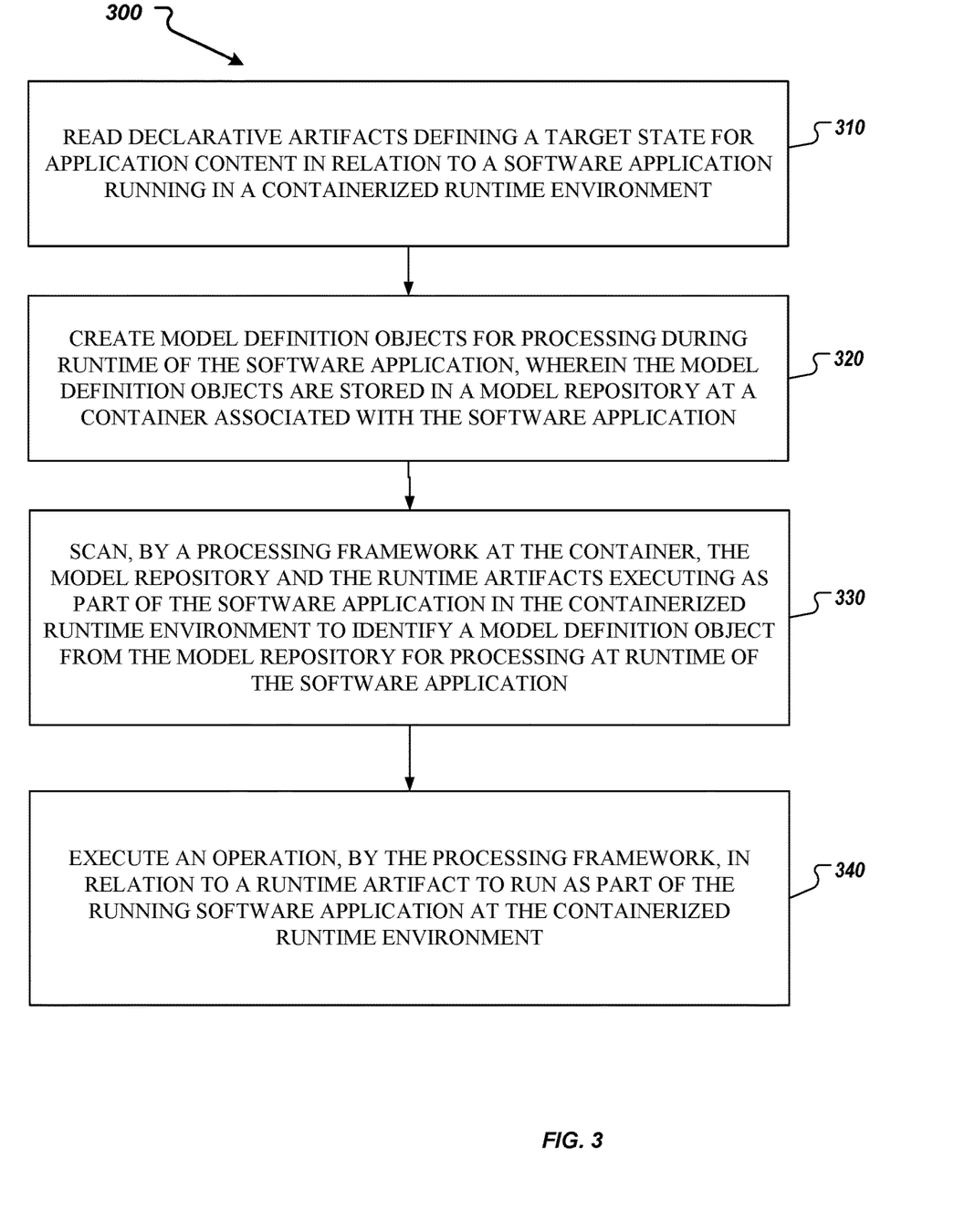
FIG. 3 is a flowchart for an example method for lifecycle processing of declarative artifacts in the context of in-system programming in a containerized runtime environment in accordance with implementations of the present disclosure.

FIG. 3 is a flowchart for an example method 300 for lifecycle processing of declarative artifacts in the context of in-system programming in a containerized runtime environment in accordance with implementations of the present disclosure. In some instances, the method 300 may be executed on the host infrastructure 104 of FIG. 1, or may be implemented as part of the logic implemented in the processing framework 130 of FIG. 1, or the processing framework 250 of FIG. 2.

In some instances, the example method 300 is implemented to support lifecycle management of design time and runtime artifacts in a containerized runtime environment. The method 300 may be triggered based on a scheduled job that is configured to initiate execution of modifications related to a running application. In some more instances, the example method 300 may be manually triggered, for example, based on user input.

At 310, declarative artifacts defining a target state for application content in relation to a software application are read. For example, the software application may be running in a containerized runtime environment and includes runtime artifacts. In yet another example, the software application may be requested to run in the containerized runtime environment as a new execution environment. The declarative artifacts define target states of runtime artifacts that are provided as input for modifying a current state of the running software application to a target state corresponding to the target states.

In some instances, the declarative artifacts are read in response to a trigger initiated from a scheduled job for managing the software application.

In some instances, the declarative artifacts that are read may be received as new artifacts for processing by the processing framework, where the processing framework may receive sets of declarative artifact in parts, where more than one set of declarative artifacts that is received may be for a particular running software application.

The declarative artifacts may be similar to the declarative artifacts 245 described in FIG. 2. The declarative artifacts may be created at a design time process for the software application. The declarative artifacts may be designed and tested. The declarative artifacts may represent a technical state of a component (e.g., runtime artifacts corresponding to a service, a database object such as a table or view, or other types of objects or components) of the software application at runtime. The declarative artifacts are declarative text-based artifacts.

In some instances, the declarative artifacts define target states for runtime artifacts running in the containerized runtime environment. In some instances, the declarative artifacts are associated with at least one of database components or an application service of the software application, or a combination of a database component, such as a table and an application service.

At 320, in response to reading the declarative artifacts, model definition objects for processing during runtime of the software application are created. In some instances, the created model definition objects include information relevant for deployment. The model definition objects are stored in a model repository at a container associated with the software application, wherein the model definition objects comprise information from the declarative artifacts. In some instances, the model definition objects are such as the model definitions in the model repository 280 of FIG. 2.

In some instances, the model repository may include binary artifacts that are created either in advance or after the creating of the model definition objects at 320. In other cases, binary artifacts created for the model definition objects at 320 may be stored at another repository at the container, or may be stored at a repository that is outside of the container, for example, at the runtime environment of the software application.

The container where the model repository stores the model definition objects may be such as the Container A 160 of FIG. 1 or the Container 240 of FIG. 2. The model definition objects stored in the model repository may be binary artifacts generated based on parsing the declarative artifacts. The model definition objects may be in text format that can be processed at runtime.

In some instances, the container is built as a deployable instance for execution at the running software application on a cloud infrastructure setup. When the container is executed at runtime, the container includes one or more runtime artifacts corresponding to one or more of the declarative artifacts as built-in artifacts.

At 330, the model repository and the runtime artifacts executing as part of the software application in the containerized runtime environment are scanned. The scanning may be performed by a processing framework at the container. The processing framework may be similar to the described processing framework 130 of FIG. 1 and/or the processing framework 250 of FIG. 2. The scanning of the model repository and the runtime artifacts is performed to identify a model definition object from the model repository to be processed at runtime of the software application.

In some instances, based on logic implemented at the processing framework, the model definition object that is identified is relevant for performing an update at the containerized runtime environment. The processing logic that may determine which model definition object is relevant for performing an update may be, for example, the logic implemented in the synchronizer 265 of FIG. 2. The processing framework may include comparison logic to identify which runtime artifacts that are part of the running software application are to be updated, and which runtime artifacts has to be created as new runtime artifacts at the runtime environment. The comparison may be performed based on scanning the model definition objects at the model repository and metadata for the runtime artifacts executing as part of the software application. For example, if a first model definition object defined a table, with a table name X, and three fields (e.g., name, address, social security number), then the metadata for the software application may be evaluated to determine whether there is a table with the same name, and the fields of such a table may be determined whether they correspond to those in the model definition objects. In the case of this example, if there is a table with a name X that is part of the running software application, however, the table has four fields, then the table part of the running software application has to be altered by executing in-system operations to provide it to the format of the model definition object.

In some instances, in addition to identifying model objects part of the model repository, the processing framework may evaluate whether there are runtime artifacts from the running software application that do not exist and thus do not correspond to particular model objects defined in the model repository for the software application that are needed for the target state. For example, a table may be defined at the current version (state) of a running database; however, the model repository may not include a model definition object for the defined table. In response to the comparison between the model objects and the running artifacts, the runtime artifacts that do not correspond to a model object, for example, based on name and type evaluation, can be associated with execution of a delete operation. In this case, the runtime artifacts that are to be deleted do not have a corresponding model definition object with a target state, for example, different set of table attributes. In such instances, a runtime artifact that do not correspond to a model definition object in the model repository is deleted, as such a runtime artifact is not part of the target state and therefore are not needed.

In some instances, the identified model definition objects are associated with declarative artifacts that are not processed by the processing framework in relation to modifying the running software application. The identified model definition objects may be related to performing operations for creating, altering, or deleting runtime artifacts at the running software application. The execution of the operations may be based on corresponding processing logic that is invoked to execute the operations according to data from the identified model definition objects. For example, when a database table is to be altered due to a change in table attributes, the model definition object includes data for the defined set of table attributes corresponding to the target state, and based on invoking the definitions and based on reviewing the metadata for the running database table, operations for altering the database table at runtime may be defined and executed.

At 340, in response to identifying the model definition object for processing, an operation is determined for execution. For example, the operation may be an update operation on a runtime artifact, for example, to modify a service method's attribute or to modify a structure of a database table or view. Further, the operation may be a create operation for generating new runtime artifacts or a delete operation for deleting an existing runtime artifact. Further examples may be provided in accordance with the present disclosure. The operation execution is based on invoking processing logic implemented at the processing framework. The executed operation is related to a runtime artifact corresponding to the identified model definition object. The operation is executed during runtime of the software application at the containerized runtime environment. The operation is executed based on processing logic implemented at the processing framework and is based on input from the identified model definition object. The runtime artifact corresponds to a particular declarative artifact associated with the model definition object.

In some instances, the executed operation related to the runtime artifact is associated with providing the runtime artifact in a runtime state corresponding to a target state defined within the particular declarative artifact associated with the model definition object. The runtime artifact that is associated with the executed operation may be a running artifact part of the running software application prior scanning by the processing framework.

In some instances, scanning the model repository and the runtime artifacts executing as part of the software application in the containerized runtime environment comprises comparing the model definition objects with metadata for the runtime artifacts of the running software application. The runtime artifacts of the software application may have corresponding metadata stored at the software application, including hash codes identifying content of the runtime artifact. When the model definition objects and the runtime artifacts are scanned, further metadata for the runtime artifacts can be scanned to compare whether the content of the model definition object and the runtime artifacts is the same or different, and whether a modifying operation is to be performed. For example, in some cases, a runtime artifact may have already been updated to the target state. A comparison may be performed based on hash codes defined for the running artifacts in a meta-data repository and within the model definition objects to determine whether previously the declarative artifacts corresponding to the model definition objects have been processed and whether the content of the runtime artifacts correspond to the definitions at the corresponding model definition objects.

In some instances, scanning the model repository and the runtime artifacts executing as part of the software application in the containerized runtime environment comprises processing the model definition object for in-system programming in the containerized runtime environment to unify states defined correspondingly in the declarative artifacts with states of runtime artifacts at the running software application. To unify the states defined in the declarative artifacts with the runtime state of the software application, the running software application is updated to a new state. The unification of the state may include creating a new runtime artifact for a model definition object that do not correspond to running artifacts at the software application. The unification of the state may include altering a running runtime artifact in response to determining that model definition objects mapped to the running runtime artifact are associated with altering operations. The unification of the state may include deleting a running runtime artifact at the software application, wherein the deleted running runtime artifact is an artifact that is not associated with a model definition object from the model repository for the software application. By executing operations, such as create, delete, updated, the running software application is updated to the target state without re-deployment of runtime artifacts that are generated based on re-developed source code to address the modification, but rather are performed in-system on the running environment.

Figure 4:
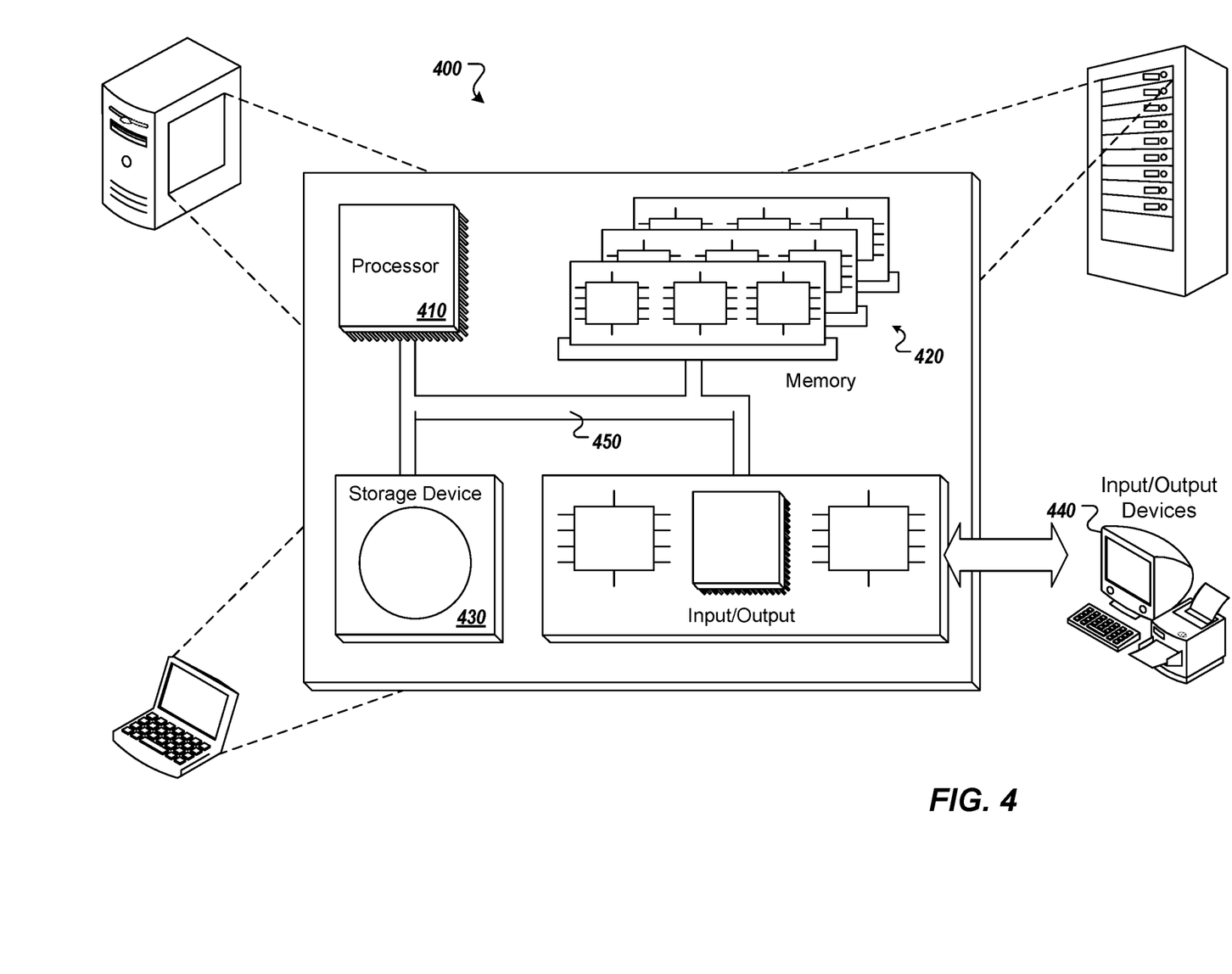
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device, such as a CRT (cathode ray tube) or LCD (liquid crystal display) monitor for displaying information to the user and a keyboard and a pointing device, such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication, such as a communication network. Examples of communication networks include: a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer implemented method for lifecycle processing of declarative artifacts, the method comprising:
reading declarative artifacts defining a target state for application content related to a software application that, when running, includes runtime artifacts executing in a containerized runtime environment;
in response to reading the declarative artifacts, creating model definition objects for processing during runtime of the software application based on the declarative artifacts, wherein the model definition objects are created based on and include information from the declarative artifacts, wherein the created model definition objects are stored in a model repository at a container associated with the software application;
scanning, by a processing framework at the container, the model repository and the runtime artifacts executing as part of the software application in the containerized runtime environment to identify a model definition object from the model repository for processing at runtime of the software application, wherein the model definition object is identified as relevant for performing an update at the containerized runtime environment to place the running software application into the target state; and
in response to identifying the model definition object for processing, executing an operation, by the processing framework, related to a runtime artifact to run as part of the running software application at the containerized runtime environment, wherein the operation is executed based on processing logic implemented at the processing framework and is based on input from the identified model definition object, wherein the runtime artifact corresponds to a particular declarative artifact associated with the model definition object.

2. The method of claim 1, wherein the declarative artifacts define target states for runtime artifacts running in the containerized runtime environment, wherein the artifacts are associated with at least one of database components or an application service of the software application.

3. The method of claim 1, wherein the executed operation related to the runtime artifact is associated with placing the runtime artifact in a runtime state corresponding to a target state defined within the particular declarative artifact associated with the model definition object.

4. The method of claim 1, wherein the declarative artifacts are read in response to a trigger initiated from a scheduled job for managing the software application, and wherein the created model definition objects include information relevant for deploying one or more of the created model definition objects.

5. The method of claim 1, wherein the identified model definition objects are associated with declarative artifacts that are not processed and are related to performing operations for creating, altering, or deleting runtime artifacts at the running software application, and wherein the execution of the operations is based on corresponding invoking the processing logic to execute the operations according to data invoked from the identified model definition objects.

6. The method of claim 1, wherein scanning the model repository and the runtime artifacts executing as part of the software application in the containerized runtime environment comprises:
comparing the model definition objects with metadata for running artifacts of the running software application, wherein comparing is based on hash codes defined for the running artifacts in a meta-data repository and within the model definition objects to determine whether the declarative artifacts corresponding to the model definition objects have been previously processed.

7. The method of claim 1, wherein the declarative artifacts are created at a design time process for the software application and represent a technical state of a component of the software application, and wherein the declarative artifacts are declarative text-based artifacts.

8. The method of claim 1, further comprising:
building the container as a deployable instance for execution at the running software application on a cloud infrastructure setup, wherein the container at runtime comprises one or more runtime artifacts corresponding to one or more of the declarative artifacts as built-in artifacts.

9. The method of claim 1, wherein scanning the model repository and the runtime artifacts executing as part of the software application in the containerized runtime environment comprises:
processing the model definition object for in-system programming in the containerized runtime environment to unify states defined correspondingly in the declarative artifacts with states of runtime artifacts at the running software application and to update the running software application to a new state, wherein unifying the states comprises:
creating a new runtime artifact for a model definition object that do not correspond to running artifacts at the software application;
altering a running runtime artifact in response to determining that model definition objects mapped to the running runtime artifact are associated with altering operations; and
deleting a running runtime artifact at the software application, wherein the deleted running runtime artifact is an artifact that is not associated with a model definition object from the model repository for the software application.

10. The method of claim 1, wherein the runtime artifact that is associated with the executed operation is part of the running software application prior scanning by the processing framework.

11. A non-transitory, computer-readable medium coupled to one or more processors and having instructions stored thereon which, when executed by the one or more processors, cause the one or more processors to perform operations, the operations comprising:
reading declarative artifacts defining a target state for application content related to a software application that, when running, includes runtime artifacts executing in a containerized runtime environment;
in response to reading the declarative artifacts, creating model definition objects for processing during runtime of the software application based on the declarative artifacts, wherein the model definition objects are created based on and include information from the declarative artifacts, wherein the created model definition objects are stored in a model repository at a container associated with the software application;
scanning, by a processing framework at the container, the model repository and the runtime artifacts executing as part of the software application in the containerized runtime environment to identify a model definition object from the model repository for processing at runtime of the software application, wherein the model definition object is identified as relevant for performing an update at the containerized runtime environment to place the running software application into the target state; and in response to identifying the model definition object for processing, executing an operation, by the processing framework, related to a runtime artifact to run as part of the running software application at the containerized runtime environment, wherein the operation is executed based on processing logic implemented at the processing framework and is based on input from the identified model definition object, wherein the runtime artifact corresponds to a particular declarative artifact associated with the model definition object.

12. The computer-readable medium of claim 11, wherein the declarative artifacts are read in response to a trigger initiated from a scheduled job for managing the software application, and wherein the created model definition objects include information relevant for deploying one or more of the created model definition objects, wherein the declarative artifacts define target states for runtime artifacts running in the containerized runtime environment, wherein the artifacts are associated with at least one of database components or an application service of the software application, and wherein the identified model definition objects are associated with declarative artifacts that are not processed and are related to performing operations for creating, altering, or deleting runtime artifacts at the running software application, and wherein the execution of the operations is based on corresponding invoking the processing logic to execute the operations according to data invoked from the identified model definition objects.

13. The computer-readable medium of claim 11, wherein the declarative artifacts are created at a design time process for the software application and represent a technical state of a component of the software application, and wherein the declarative artifacts are declarative text-based artifacts, and wherein the executed operation related to the runtime artifact is associated with placing the runtime artifact in a runtime state corresponding to a target state defined within the particular declarative artifact associated with the model definition object.

14. The computer-readable medium of claim 11, wherein scanning the model repository and the runtime artifacts executing as part of the software application in the containerized runtime environment comprises:
comparing the model definition objects with metadata for running artifacts of the running software application, wherein comparing is based on hash codes defined for the running artifacts in a meta-data repository and within the model definition objects to determine whether the declarative artifacts corresponding to the model definition objects have been previously processed,
wherein the runtime artifact that is associated with the executed operation is part of the running software application prior scanning by the processing framework.

15. The computer readable medium of claim 11, wherein the operations comprise:
building the container as a deployable instance for execution at the running software application on a cloud infrastructure setup, wherein the container at runtime comprises one or more runtime artifacts corresponding to one or more of the declarative artifacts as built-in artifacts.

16. The computer-readable medium of claim 11, wherein scanning the model repository and the runtime artifacts executing as part of the software application in the containerized runtime environment comprises:
processing the model definition object for in-system programming in the containerized runtime environment to unify states defined correspondingly in the declarative artifacts with states of runtime artifacts at the running software application and to update the running software application to a new state, wherein unifying the states comprises:
creating a new runtime artifact for a model definition object that do not correspond to running artifacts at the software application;
altering a running runtime artifact in response to determining that model definition objects mapped to the running runtime artifact are associated with altering operations; and
deleting a running runtime artifact at the software application, wherein the deleted running runtime artifact is an artifact that is not associated with a model definition object from the model repository for the software application.

17. A system comprising
a computing device; and
a computer-readable storage device coupled to the computing device and having instructions stored thereon which, when executed by the computing device, cause the computing device to perform operations, the operations comprising:
reading declarative artifacts defining a target state for application content related to a software application that, when running, includes runtime artifacts executing in a containerized runtime environment;
in response to reading the declarative artifacts, creating model definition objects for processing during runtime of the software application based on the declarative artifacts, wherein the model definition objects are created based on and include information from the declarative artifacts, wherein the created model definition objects are stored in a model repository at a container associated with the software application;
scanning, by a processing framework at the container, the model repository and the runtime artifacts executing as part of the software application in the containerized runtime environment to identify a model definition object from the model repository for processing at runtime of the software application, wherein the model definition object is identified as relevant for performing an update at the containerized runtime environment to place the running software application into the target state; and
in response to identifying the model definition object for processing, executing an operation, by the processing framework, related to a runtime artifact to run as part of the running software application at the containerized runtime environment, wherein the operation is executed based on processing logic implemented at the processing framework and is based on input from the identified model definition object, wherein the runtime artifact corresponds to a particular declarative artifact associated with the model definition object.

18. The system of claim 17, wherein the declarative artifacts are read in response to a trigger initiated from a scheduled job for managing the software application, and wherein the created model definition objects include information relevant for deploying one or more of the created model definition objects, wherein the declarative artifacts define target states for runtime artifacts running in the containerized runtime environment, wherein the artifacts are associated with at least one of database components or an application service of the software application, and wherein the identified model definition objects are associated with declarative artifacts that are not processed and are related to performing operations for creating, altering, or deleting runtime artifacts at the running software application, and wherein the execution of the operations is based on corresponding invoking the processing logic to execute the operations according to data invoked from the identified model definition objects.

19. The system of claim 17, wherein the system further comprises instructions which when executed causes the compute the computing device to perform operations comprising:

building the container as a deployable instance for execution at the running software application on a cloud infrastructure setup, wherein the container at runtime comprises one or more runtime artifacts corresponding to one or more of the declarative artifacts as built-in artifacts.

20. The system of claim 17, wherein scanning the model repository and the runtime artifacts executing as part of the software application in the containerized runtime environment comprises:

processing the model definition object for in-system programming in the containerized runtime environment to unify states defined correspondingly in the declarative artifacts with states of runtime artifacts at the running software application and to update the running software application to a new state, wherein unifying the states comprises:

creating a new runtime artifact for a model definition object that do not correspond to running artifacts at the software application;

altering a running runtime artifact in response to determining that model definition objects mapped to the running runtime artifact are associated with altering operations; and deleting a running runtime artifact at the software application, wherein the deleted running runtime artifact is an artifact that is not associated with a model definition object from the model repository for the software application.

* * * * *